FIP8102 OR 3,074,018

X5283R
X5225H

SEARCH ROOM

INVENTOR.
BYRON W. ST. CLAIR
BY
Dean, Fairbank & Hirsch
ATTORNEYS

United States Patent Office 3,074,018

Patented Jan. 15, 1963

3,074,018
MONITORING DEVICE

Byron W. St. Clair, New Rochelle, N.Y., assignor to Adler Electronics, Inc., a corporation of New York Filed Dec. 10, 1958, Ser. No. 779,311
16 Claims. (Cl. 325—134)

Figures 1, 2, 3:
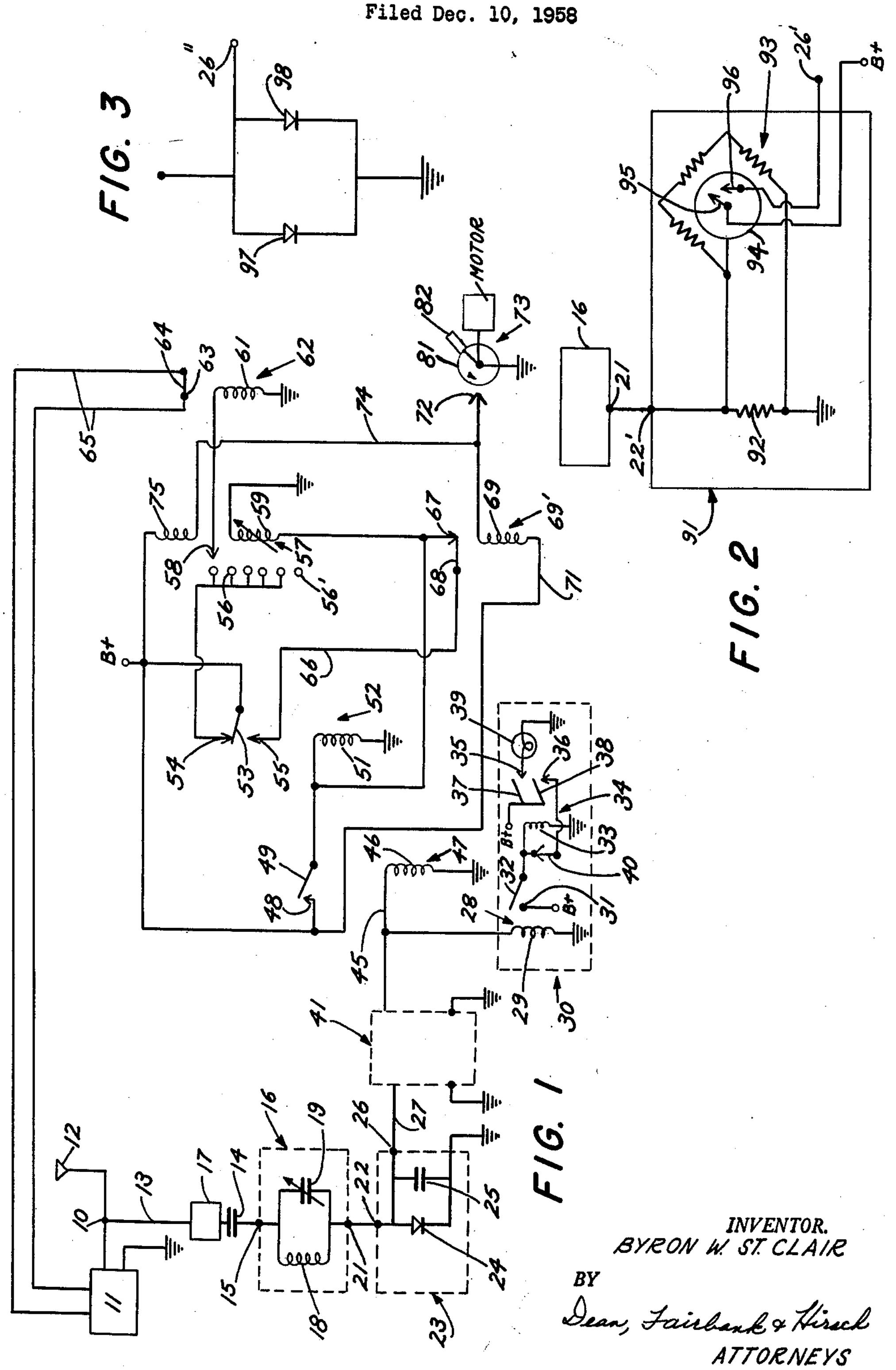

This invention relates to the art of monitoring equipment, more particularly for preventing off-frequency radiation from a transmitter.

As conducive to an understanding of the invention it is noted that if a radio-frequency transmitter should produce off-frequency signals for some reason, the transmission of such undesired signals might cause interference with other transmissions. This can be extremely harmful if such off-frequency transmission continues for any considerable length of time for it may block or jam communications between aircraft and ground stations, television transmission, communications between ground stations and the like.

It is accordingly among the objects of the invention to provide an equipment which is relatively simple in construction, which will dependably monitor the output from an oscillating source and based upon components of such output which deviate from a predetermined range of frequencies, will automatically provide a control signal which will serve to warn the operator that the transmitter is off-frequency.

Such off-frequency transmission is of particular concern where the transmitter is of the unattended type such as a micro-wave relay. Equipment of this type which is frequently located at a relatively inaccessible site such as at the top of a mountain, receives a signal and re-transmits it one the same or a different frequency to another point.

If such transmitter should go off-frequency, due to the long period of time required to reach the transmitter for adjustment thereof, the continued off-frequency transmission might have serious consequences as above noted.

It is accordingly another object of the invention to provide an equipment of the above type which will utilize the control signal resulting from the off-frequency transmission automatically to cut off the transmitter to prevent further transmission of off-frequency signals, if such off-frequency transmission continues beyond a predetermined period of time or if it occurs a predetermined number of times each of shorter duration.

According to the invention, these objects are accomplished by the arrangement and combination of elements hereinafter described and more particularly recited in the claims.

In the accompanying drawings in which are shown one or more of various possible embodiments of the several features of the invention, FIG. 1 is a circuit diagram of one embodiment of the invention, and FIGS. 2 and 3 are partial circuit diagrams of other embodiments thereof.

Referring now to the drawings, in the embodiment shown in FIG. 1, the output terminal 10 of a transmitter 11 which feeds an antenna 12, is connected by line 13 through capacitor 14, which blocks direct current, to the input 15 of a band reject filter 16.

In certain cases where the output frequency of the transmitter 11 is high, it is desirable to reduce the frequencies fed through line 13, to the filter 16 and subsequent circuit elements, to a value that is more readily acted on in the manner to be described. To this end, a heterodyne mixer 17 of conventional type may be connected between terminal 10 and capacitor 14 to provide a frequency that when mixed with that tapped off from terminal 10 will be of a desired value.

In the illustrative embodiment shown in FIG. 1, the filter 16 comprises a parallel connected inductance 18 and capacitor 19 which may be tuned to the frequency to be rejected, which is the desired frequency that the transmitter 11 is to radiate. Thus, the filter 16 will only pass signals to its output 21 that deviate from the frequency of the signal to be radiated by the transmitter 11.

The output of the filter 16 is connected to the input 22 of a broad band detector 23, illustratively of the crystal type, which by means of its crystal 24 and capacitor 25 rectifies and filters the alternating current signals applied to its input to provide a D.C. signal at its output 26.

With the equipment thus far described, with the transmitter 11 tuned to a predetermined frequency, the filter 16 is also tuned to such frequency. As a result, it will reject such frequency and substantially no signal will appear at its output 21.

If, however, for any reason the transmitter should go off-frequency, then the filter 16 will pass such frequencies so that a signal will appear at the input 22 of detector 23. This signal will be rectified and will appear as a D.C. signal at the output 26.

Such D.C. signal is fed through lead 27 to the input of an alarm circuit 30. Such circuit comprises a relay 28, one side of the coil 29 of which is connected to lead 27, the other side of the coil being connected to ground.

The relay has a fixed contact 31 connected to B+ and a movable contact arm 32 connected to one side of the coil 33 of a relay 34 which has fixed contacts 35, 36 and associated movable contact arms 37, 38, ganged to move in unison and electrically connected to B+. The fixed contact 35 is connected through lamp 39 to ground and the fixed contact 36 is connected through normally closed re-set switch 40 to arm 32 to provide a holding circuit for said relay 34.

With the system thus far described, when the transmitter is off-frequency, the D.C. signal at output 26 will cause relay 28 to be energized thereby closing its contacts 31, 32. This will cause relay 34 to be energized, closing its contacts 35, 37 and 36, 38. Closing of contacts 35, 37 will cause lamp 39 to be energized serving as an indication that the transmitter is off-frequency and closing of contacts 36, 38 will provide a holding circuit for the relay 34, to retain lamp 39 energized even if the transmitter should cease to generate spurious outputs so that the operator will know that an erroneous condition, i.e., off-frequency transmission occurred, even though momentarily.

In cases where it is not desired to give a warning of off-frequency transmission unless the amplitude of the spurious signals radiated exceeds a predetermined amount, a voltage discriminator circuit 41 may be connected in line 27 and designed to provide an output to relay 28 only if the amplitude of the spurious signals exceeds such predetermined amount.

The visual warning indication above described is useful where an operator is present at the transmitter site. Thus, if the warning lamp 39 should be energized, the operator can check to see if the condition was only temporary by momentarily opening the re-set switch 40. If the lamp 39 is again energized, the operator can then cut off the transmitter to prevent further radiation of off-frequency signals.

Where the transmitter is at a remote site, as is the case of a micro-wave relay transmitter, it is essential that the transmitter automatically be cut off if it generates spurious outputs.

To this end, the visual alarm circuit 30 may be eliminated and the output 26 of the detector 23 connected through lines 27 and 45 directly to coil 46 of relay 47 or through the voltage discriminator 41 if desired.

The relay 47 has a fixed contact 48 connected to B+ and a normally spaced movable contact arm 49 connected to one side of the coil 51 of a time delay relay 52, the other side of which is connected to ground. The relay 52 has a movable contact arm 53 which when the coil 51 is not energized, normally engages fixed contact 54 and is spaced from fixed contact 55. The contact arm 53 is connected to B+ and the fixed contact 54 is connected to a predetermined number of the fixed contacts 56 of a stepping switch 57 which are successively engaged by a contact arm 58 as the coil 59 of the stepping switch is energized.

The stepping switch may be of the type that requires a pulse of predetermined duration, which may be set as desired, for its actuation and the contact arm 58 thereof is connected to one side of the coil 61 of a control relay 62, the other side of which is connected to ground. The relay 62 has a pair of contacts 63, 64 which are normally closed when the relay is energized and which when opened, through lines 65 leading to the transmitter 11 will through conventional circuits cut off the latter.

The fixed contact 55 of relay 52 is connected by lead 66 through normally closed contacts 67, 68 to the contact arm 49 which is connected to one side of coil 51 to provide a holding circuit for relay 52.

Means are provided automatically to reset the time delay relay 52 and the stepping switch 57. Although this may be accomplished in any suitable manner, in the illustrative embodiment shown, a relay 69' is provided which includes the contacts 67, 68 and a coil 69. One end of the coil 69 is connected by lead 71 to B+ and the other end to fixed contact 72 of timer 73 and by lead 74 to one end of the reset coil 75 of the stepping switch 57, the other end of coil 75 being connected to B+.

The timer includes a motor operated disc 81 which has a contact finger 82 connected to ground, to complete a circuit to coils 69 and 75 in the manner hereinafter described.

In the operation of the system, as thus described, it is assumed, for purpose of illustration, that it is desired to turn off the transmitter if it is producing off-frequency components and such off-frequency components have a continuous duration of over say 10 seconds and also to turn off the transmitter if there are a series of off-frequency components each lasting over say one second and also to reset the equipment say every hour to repeat the monitoring action to see if the off-frequency transmission still occurs.

To this end, the time delay relay 52 is set for 10 seconds; the stepping switch 57 is set so that it requires an off-frequency transmission lasting at least one second for each step and the timer 73 is set to close once each hour.

When the transmitter goes off-frequency, as previously described, a D.C. signal will be developed at output 26 which will energize the relay 47. As a result, the contacts 48, 49 will close to connect the B+ supply to coil 51 of time delay relay 52 to set the latter into operation. At the same time the B+ supply will be connected to the coil 59 of stepping switch 57.

Assuming that the duration of the off-frequency radiation is at least 10 seconds, the time delay relay 52 will be actuated to open contacts 53, 54 and close contacts 53, 55. When contacts 53, 54 open, the B+ supply to the fixed contacts 56 of the stepping switch 57 will be cut off with the result that relay 62 will be de-energized so that its contacts 63, 64 will open. Through conventional circuits in the transmitter 11 this will cut off the latter to stop further transmission thereof.

Closing of contacts 53, 55 will connect B+ to the coil 51 of relay 52 to provide a holding circuit for the latter so that the transmitter will remain cut off.

Since the B+ supply was also connected to the coil 59 of stepping switch 57 and the duration of the off-frequency transmission exceeded one second, the stepping switch will be actuated to advance its contact arm 58 to the next fixed contact 56 which also is connected to the B+ supply. However, as only one off-frequency transmission occurred, which lasted over 10 seconds, control relay 62 would be de-energized as previously described.

Assuming that the off-frequency transmission lasted only one second so that time delay relay 52 would not be actuated, but stepping switch 57 would be actuated to advance contact arm 58 one step, the relay 62 would still remain energized. If the transmitter went back to its normal operating frequency and then went off-frequency four additional times, in the illustrative embodiment shown, with each off-frequency transmission being less than 10 seconds, but at least one second, the contact arm 58 would be advanced to contact 56'. However, since this contact is not connected to B+, the relay 62 would be de-energized so that contacts 63 and 64 would open to cut off the transmitter.

As a result, there is assurance that with an off-frequency transmission of say 10 seconds or after a plurality of off-frequency transmissions, illustratively four, each of say one second duration, the transmitter would also be cut off.

Once either the time delay relay 52 is energized or the stepping switch moves to contact 56', the transmitter 11 will remain cut off. However, as it is possible that the condition causing the off-frequency transmission may not persist, the equipment automatically resets. This is accomplished by the timer 73 which once each hour for example, will momentarily complete a circuit from B+ to ground through reset coils 69 and 75.

When coil 69 is energized, contacts 67, 68 will momentarily open to break the holding circuit for relay 52 to move contact arm 53 away from contact 55 back into engagement with contact 54.

When coil 75 is energized, the contact arm 58 of stepping switch 57 will be restored to its start position.

Thus, the equipment at predetermined intervals based on the setting of timer 73 is reset to close contacts 63, 64 to restore the transmitter to operating condition with the equipment ready to monitor the output.

Instead of the crystal type broad band detector 23 shown in FIG. 1, other devices can be employed to detect the current flow caused by off-frequency signals passing through the filter 16.

In the embodiment shown in FIG. 2, for example, a bolometer bridge unit 91 is employed which includes a bolometer resistor 92, the resistance of which changes with current flow. The output 21 of the filter 16 is connected to the input 22' of unit 91 which is connected through the current responsive resistor 92 to ground. The variation of the resistance of the resistor 92 is determined by a Wheatstone bridge 93 for example, across which a meter 94 is connected. The meter actuates contacts 95, 96 to close the latter when the amplitude of the off-frequency signal is a predetermined amount to connect the B+ source to output 26' to actuate the relay 47 in the manner previously described.

In the embodiment of FIG. 3, the filter 16 and detector 23 of FIG. 1 are replaced by frequency sensitive rectifiers 97 and 98 connected in parallel as shown. Each of the rectifiers is sensitive to a different range of frequencies which are on each side of the desired frequency to be transmitted. Thus, a D.C. signal will be developed when the transmitter is off-frequency and this D.C. signal will appear at output terminal 26'' to be applied to the control relay 47 as previously described.

Although the monitoring equipment is illustratively shown directly coupled to the output of the transmitter, it is of course to be understood that it could be fed without direct connection by any suitable transducer such as an R.F. receiver, for example.

It is further to be noted that where A.C. relays are employed, the detector 23 (FIG. 1) could be eliminated and the relay 47 fed from the output of filter 16. If necessary, suitable amplifiers may be used to increase the amplitude of the A.C. signal.

As many changes could be made in the above system and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Monitoring equipment of the character described comprising means to sample the output from a source of oscillating energy, means fed from said sampling means to provide an output for only those frequencies that are outside the limits of a predetermined frequency range thereby preventing passage of frequencies inside said limits, and means controlled by said second output to provide a control signal when frequencies outside said predetermined frequency range are present.

2. The combination set forth in claim 1 in which means are provided actuated by said control signal to cut off further transmission from such oscillating source.

3. The combination set forth in claim 1 in which means are provided actuated by said control signal to cut off further transmission from such oscillating source, and means to actuate said cut off means when the frequencies transmitted which deviate from the predetermined range of frequencies continue for a predetermined period of time.

4. The combination set forth in claim 1 in which means are provided actuated by said control signal to cut off further transmission from such oscillating source, and means to actuate said cut off means when the control signal developed by the frequencies transmitted, which deviate from the predetermined range of frequencies, has occurred a predetermined number of times.

5. The combination set forth in claim 1 in which means are provided actuated by said control signal to cut off further transmission from such oscillating source, and means to actuate said cut off means when the frequencies transmitted which deviate from the predetermined range of frequencies, continue for a predetermined period of time, and means to reset said last named actuating means and to reset said cut off means after a predetermined time interval.

6. The combination set forth in claim 1 in which means are provided actuated by said control signal to cut off further transmission from such oscillating source, and means to actuate said cut off means when the control signal developed by the frequencies transmitted which deviate from the predetermined range of frequencies, has occurred a predetermined number of times, and means to reset said last named actuating means and to reset said cut off means after a predetermined time interval.

7. The combination set forth in claim 1 in which the means to reject a predetermined range of frequencies from the source and to pass other frequencies transmitted, comprises a filter in circuit between the source and the means to provide an output based upon such passed frequencies.

8. The combination set forth in claim 7 in which said filter comprises a resonant circuit having means for tuning thereof to the predetermined frequency.

9. The combination set forth in claim 7 in which means are provided to heterodyne a predetermined frequency with the output from the source of oscillating energy to permit monitoring at a more convenient frequency range.

10. The combination set forth in claim 7 in which the means to provide an output based upon such passed frequencies comprises a broad band detector.

11. The combination set forth in claim 1 in which means are provided controlled by a predetermined amplitude of the output based upon such passed frequencies to actuate the means to provide a control signal.

12. The combination set forth in claim 1 in which a relay is actuated by the output based upon such passed frequencies, a second relay is provided controlled by said first relay and actuated when said first relay is actuated, an indicator controlled by the actuation of said second relay and a holding circuit for said second relay.

13. The combination set forth in claim 1 in which a time delay relay is provided energized by the output based upon such passed frequencies, to provide a control signal when the frequencies transmitted which deviate from the predetermined range of frequencies, continue for a predetermined period of time and a control relay is actuated by said control signal to cut off said oscillating source.

14. The combination set forth in claim 13 in which means are provided to reset said time delay relay at predetermined time intervals.

15. The combination set forth in claim 1 in which a stepping switch is provided energized by successive outputs based upon such passed frequencies and adapted to provide a control signal when it has advanced a predetermined number of steps and a control relay is actuated by said control signal to cut off said oscillating source.

16. Monitoring equipment of the character described comprising means to pick up signals from an oscillating source, means to reject a predetermined range of frequencies from such source and to pass other frequencies transmitted, means to provide an output based upon such passed frequencies, a stepping switch energized by successive outputs based upon such passed frequencies, a control relay actuated when said stepping switch has advanced a predetermined number of steps to cut off said oscillating source and means to reset said stepping switch at predetermined time intervals.

References Cited in the file of this patent

UNITED STATES PATENTS

| | | |
|---|---|---|
| Re. 21,659 | Abler | Dec. 17, 1940 |
| 1,885,214 | Almquist et al. | Nov. 1, 1932 |
| 2,007,371 | Hopkins | July 9, 1935 |
| 2,165,848 | Gothe et al. | July 11, 1939 |
| 2,449,412 | Rathenau et al. | Sept. 14, 1948 |
| 2,496,879 | Lafferty | Feb. 7, 1950 |
| 2,497,404 | Gierginger et al. | Feb. 14, 1950 |
| 2,659,008 | Floyd | Nov. 10, 1953 |
| 2,677,122 | Gardner | Apr. 27, 1954 |
| 2,692,946 | Schroeder | Oct. 26, 1954 |
| 2,886,703 | Undy | May 12, 1959 |
| 2,896,164 | Bizouard et al. | July 21, 1959 |